(12) United States Patent
Kesselgruber et al.

(10) Patent No.: US 7,487,973 B1
(45) Date of Patent: Feb. 10, 2009

(54) MULTI-CHANNEL HYDRAULIC CONTROL UNIT FOR AN ACTIVE VEHICLE SUSPENSION

(75) Inventors: Dirk Kesselgruber, Düsseldorf (DE); Harry Hunnicutt, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 558 days.

(21) Appl. No.: 11/210,377

(22) Filed: Aug. 24, 2005

(51) Int. Cl.
*B60G 21/045* (2006.01)
*B60G 17/0195* (2006.01)
(52) U.S. Cl. .................. 280/5.506; 280/124.157
(58) Field of Classification Search ........... 280/5.502, 280/5.506, 5.508, 5.511, 5.513, 124.106, 280/124.157
See application file for complete search history.

(56) References Cited

U.S. PATENT DOCUMENTS

| | | | |
|---|---|---|---|
| 5,529,324 A | 6/1996 | Krawczyk et al. | |
| 5,735,540 A | 4/1998 | Schiffler | |
| 6,179,310 B1 | 1/2001 | Clare et al. | |
| 6,206,383 B1 | 3/2001 | Burdock | |
| 6,302,417 B1 | 10/2001 | Heyring | |
| 6,520,510 B1 | 2/2003 | Germain et al. | |
| 6,533,294 B1 | 3/2003 | Germain et al. | |
| 7,234,707 B2* | 6/2007 | Green et al. | 280/5.511 |
| 2003/0047898 A1* | 3/2003 | Nagy et al. | 280/124.157 |
| 2005/0146098 A1* | 7/2005 | Green et al. | 280/5.508 |

* cited by examiner

*Primary Examiner*—Paul N. Dickson
*Assistant Examiner*—Joseph Rocca
(74) *Attorney, Agent, or Firm*—MacMillan, Sobanski & Todd, LLC

(57) ABSTRACT

A vehicle Active Roll Control System having a two stage spool valve that provides hydraulic fluid at different pressures to front and rear actuators for varying the torque applied to associated roll bars.

17 Claims, 11 Drawing Sheets

MULTI-CHANNEL HYDRAULIC CONTROL UNIT FOR AN ACTIVE VEHICLE SUSPENSION

CROSS-REFERENCE TO RELATED APPLICATIONS

Not Applicable

BACKGROUND OF THE INVENTION

This invention relates in general to active vehicle suspensions and in particular to a multi-channel hydraulic control unit for such a suspension.

Vehicle suspension systems control chassis motion during operation of the vehicle in order to isolate the vehicle load from irregularities in the terrain over which the vehicle travels. One such chassis motion, that is controlled by know suspension systems, is chassis roll. A vehicle experiences chassis roll during a turning maneuver. During chassis roll, the chassis tilts or "rolls" about the vehicle's fore-to-aft axis toward an outside direction of the turn.

In the past, vehicles have been provided with passive suspension systems that normally include a spring and damper connected in parallel between sprung and unsprung portions of the vehicle. Accordingly, a spring and damper is typically provided for each vehicle wheel. Passive suspension systems are generally self-contained and only react to loads applied to them.

More recently, active suspension systems have been developed that apply positive reactions to applied loads. Active suspension systems typically include hydraulic or pneumatic actuators that are coupled to the passive suspension system components. A typical prior art active suspension system with a hydraulically actuated active roll control system 10 is illustrated in FIG. 1. The roll control system 10 includes an Electronic Control Unit (ECU) 12 that is in electrical communication with at least one wheel speed sensor 14, a lateral accelerometer 16 and a steering angle detector 18 that together provide a means for sensing forces that cause the vehicle to roll.

The active roll control system 10 also includes a front anti-roll, or stabilizer, bar 20 and a front hydraulic actuator 22 associated with a pair of vehicle front wheels 24. Similarly, a rear anti-roll, or stabilizer, bar 26 and a rear hydraulic actuator 28 are associated with a pair of rear vehicle wheels 30. As illustrated in FIG. 1, both the front and rear hydraulic actuators comprise a piston and cylinder assembly. The front anti-roll bar 20 is mounted upon the vehicle body (not shown) with a first end connected via the front hydraulic actuator 22 and a front actuator strut 32 to one of a pair of front suspension arms 34. A second end of the front anti-roll bar 20 is connected via a front suspension strut 36 to the other of the front suspension arms 34. Similarly, the rear anti-roll bar 26 also is mounted upon the vehicle body (not shown) with a first end connected via hydraulic actuator 28 and a rear actuator strut 38 to one of a pair of rear suspension arms 40. A second end of the rear anti-roll bar 26 is connected via a rear suspension strut 42 to the other of the rear suspension arms 40.

The roll control system 10 further includes a pump 44 having an intake port connected by a first hydraulic fluid line 46 to a hydraulic fluid reservoir 48 and a discharge port connected by a second hydraulic fluid line 50 to a suspension fluid control device 52. A hydraulic fluid supply line 54 connects the suspension fluid control device 52 to a power steering valve assembly 56 while a hydraulic fluid discharge line 57 connects the power steering valve assembly 56 to the hydraulic fluid reservoir 48. The suspension fluid control device 52 is connected by front hydraulic supply lines 58 and 60 to the front and rear hydraulic actuators 22 and 28, respectively. The front and rear actuators 22 and 28 are also connected to the suspension control device 52 by hydraulic return lines 62 and 64, respectively, while the control device 52 is connected to the fluid reservoir 48 by a discharge line 66.

A fluid schematic drawing for the roll control system 10 is shown in FIG. 2 where components that are similar to components shown in FIG. 1 have the same numerical designators. Because so many vehicles are equipped with power steering, the power steering pump 44 is typically used to supply pressurized hydraulic fluid to both the power steering valve assembly 56 and the roll control system 10, as shown in FIG. 2. The roll control system 10 includes a three-position four-way directional control valve 72 for controlling the flow of hydraulic fluid to the front and rear cylinder and piston assemblies 22 and 26. A slidable spindle within the control valve is 72 moved axially by first and second pilot valves 72a and 72b, respectively, that are located in the ends of the directional valve. The first pilot valve 72a of the directional control valve 72 is connected to an normally closed digital solenoid valve 73a and a normally open digital solenoid valve 74a. Similarly, the second pilot valve 72b also is connected to an normally closed digital solenoid valve 73b and a normally open digital solenoid valve 74b. The directional control valve 72 is connected by a drain line 66 to the fluid reservoir 48 and by a feed line 75 to a priority valve 76. The priority valve 76 receives pressurized hydraulic fluid from the power steering pump 44 and divides the pump fluid flow between the power steering valve assembly 54 and the directional control valve 72. Typically, the power steering pump 44 is oversized by approximately 50 percent to provide flow for both the power steering and the roll control system 10. The pressure within the roll control system 10 is controlled by a two stage proportional pressure relief valve 77 having a main stage 78a controlled by a pilot stage 78b. As shown in FIG. 2, the pressure relief valve 77 is connected between the feed line 75 supplying pressurized hydraulic fluid to the directional control valve 72 and the reservoir 48. When there is no flow demand from the actuators 22 and 26, all of the fluid flow in line 75 for the roll control system 10 is diverted to the reservoir 48. Otherwise, the pressure of the hydraulic fluid supplied to the directional control valve 72 is controlled by the pressure relief valve 77 reducing the diverted flow to the reservoir 48. The roll control system 10 also includes a pair of pressure sensors 79 that monitor the hydraulic fluid pressure being supplied to the front and rear cylinder and piston assemblies 22 and 26 at the outlet ports A and B.

The roll control system 10 shown in FIG. 2 allows small valves to control large flows. Flow is supplied by a hydraulic pump which is powered in some fashion by the motor vehicle and directed to the actuators 22 and 26 by a three-position-four-way valve 72 that is controlled by two pairs of small ABS style solenoid valves 73 and 74. This allows for a minimum of power to be supplied by the vehicle to operate the system 10. Also, this valve arrangement allows a desirable failure mode where hydraulic fluid is locked into the hydraulic actuators 22 and 26, there by locking in the anti-roll bar in case of a system failure. If electrical power is not or can not be supplied to the small digital valves 73 and 74, the three-position-four-way valve 72 will maintain a center position locking fluid into the actuators 22 and 26 and causing the anti-roll bar to act as in a conventional suspension system. Fluid pressure is determined by a valve that supplies pressure proportional to an applied current. The use of a piloted operated pressure control valve 77 allows a small valve 78a to control large flows without large pressure drops added to the system.

During operation of the vehicle, the ECU 12 receives input signals from the wheel speed sensor 14, the lateral accelerometer 16 and the steering angle detector 18. The ECU 12 processes the input signals to determine any roll of the vehicle relative to the front and rear wheels 24 and 30. Based upon the roll determination, the ECU 12 activates the fluid control device 52 to supply pressurized hydraulic fluid to one end of the hydraulic actuators 22 and 28. In response, both of the pistons move axially within the cylinders to input a torque through the anti-roll bars 20 and 26 to cancel the roll of the vehicle. For example, when the spool in the valve 72 is shifted in a downward direction in FIG. 2, both of the pistons are urged in a downward axial direction. Conversely, when the valve shuttle is shifted to the left in FIG. 2, both of the pistons are urged in an upward direction.

Additional details of the active roll control system 10 shown in FIGS. 1 and 2 are included in U.S. patent application Ser. No. 11/000,319, which is incorporated herein by reference.

BRIEF SUMMARY OF THE INVENTION

This invention relates to a multi-channel hydraulic control unit for an active vehicle suspension.

It is apparent that the active roll control system 10 described above is rather complex and includes components positioned in separated locations throughout the vehicle. The separation of the components can complicate trouble shooting and maintenance of the system 10. Accordingly, it would be desirable to consolidate the components of the system into one central location. Also, it would be desirable to utilize available hardware components in the roll control system 10 to reduce the inventory carried by manufacturers and service centers. Additionally, as shown in FIG. 2, the prior art roll control system 10 applies the same pressure to both the front and rear actuators 22 and 26. Accordingly, both the front and rear roll bars 20 and 25 have the same torques applied to them. However, it may be desirable, under certain operating conditions to apply a different torque to the rear roll bar 25 than the torque applied to the front roll bar 20 to compensate for different loading at the opposite ends of the vehicle.

The present invention contemplates a control unit for an active vehicle suspension system, the control unit that includes a valve body adapted to be connected to a roll control actuator device. A plurality of valves are mounted upon the valve body with the valves operable to control the roll control actuator device. A housing is removeably attached to the valve body and electronic components are disposed within the housing that are operable to selectively operate the valves.

The present invention also contemplates that the control unit includes a two stage four way two position pilot actuated spool valve with the first stage having a first input port adapted to connected to a source of pressurized fluid and the second stage having a second input port of said first stage adapted to be connected to a fluid reservoir. The control unit also includes a pressure reduction stage having an input adapted to be connected to the source of pressurized fluid and an output connected to a first input port of the second stage of the spool valve. The second stage of the spool valve also has a second input port adapted to be connected to the fluid reservoir. The invention further contemplates that the first stage of the spool valve has a pair of output ports that define a first channel having a first operating pressure and the second stage of said spool valve has a pair of output ports that define a second channel having a second operating pressure that is less than the first operating pressure. The control unit further includes a controller operative to control a supply of pilot fluid to the spool valve.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 3:
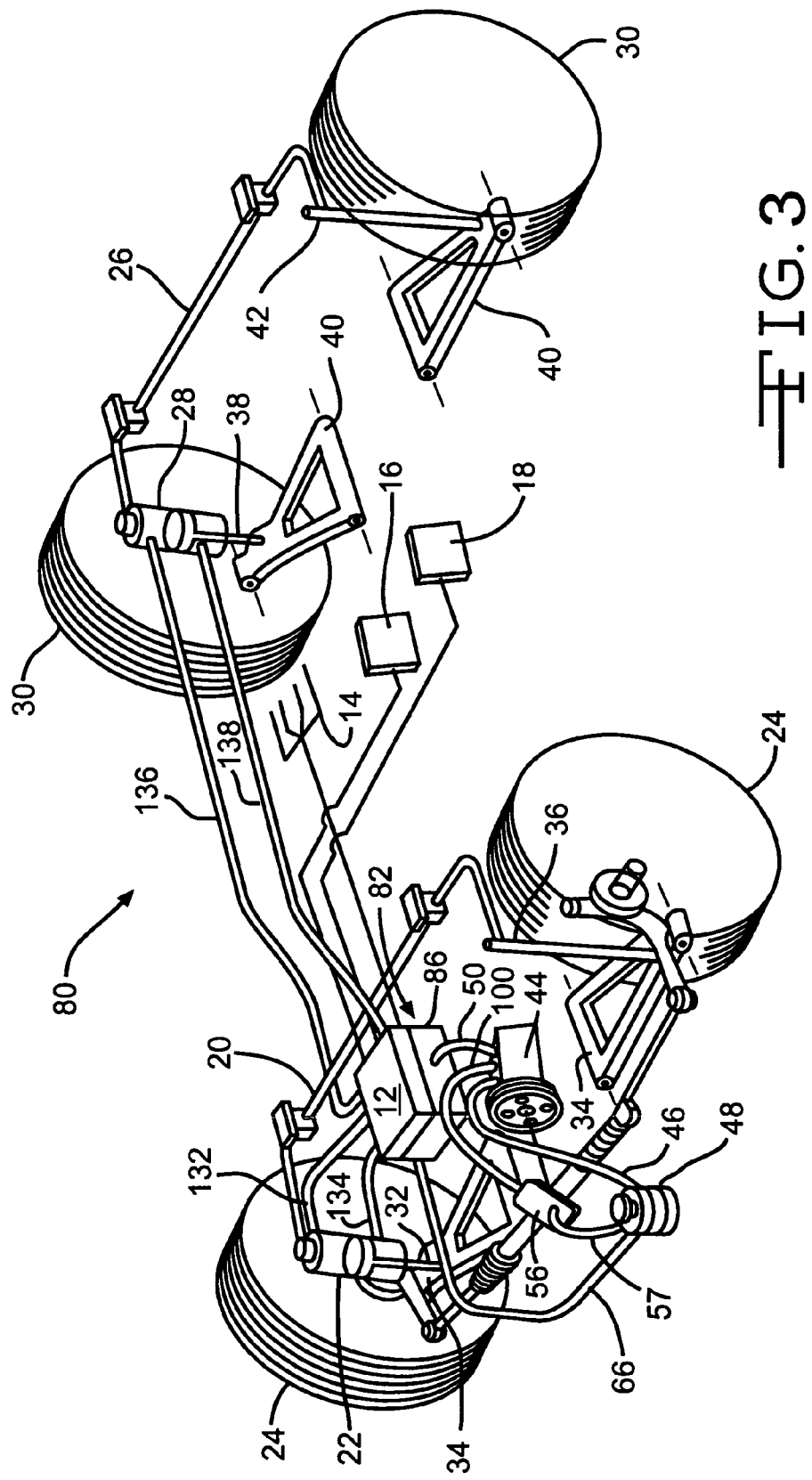
FIG. 3 is a schematic drawing for a multi-channel suspension roll control system that includes an integrated control unit in accordance with the present invention.
Figure 4:
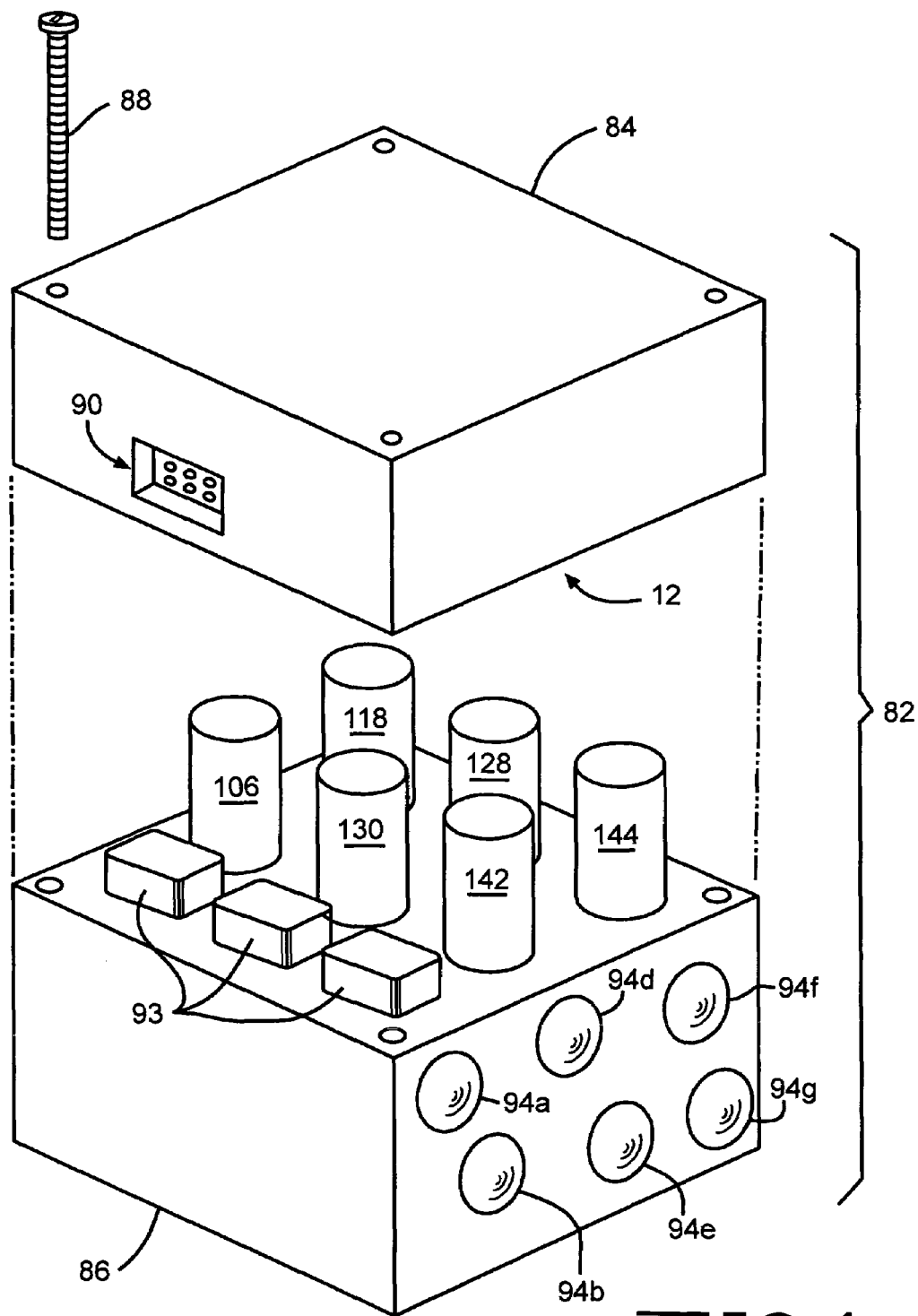
FIG. 4 is a perspective exploded view of a Hydraulic Control Unit that is included in the control system shown in FIG. 3.

Referring again to the drawings, there is illustrated in FIG. 3 a multi-channel Active Roll Control (ARC) system 80 for a vehicle suspension system. Components shown in FIG. 3 that are similar to components shown in FIG. 1 have the same numerical identifiers. The system 80 includes an integrated control unit 82 that is illustrated with an exploded view in FIG. 4. As shown in FIG. 4, the integrated control unit 82 includes the ECU 12 described above; however, the ECU 12 is disposed within a housing 84 that is removably attached to a hydraulic valve body 86 by a plurality of threaded fasteners 88 (one shown). A seal (not shown) extends around the perimeter of the bottom edge of the ECU housing 84 and forms a seal with the top surface of the hydraulic valve body 86 when the ECU housing 84 is mounted thereon. The ECU 12 is electrically connected via an electrical connector 90 carried by the housing 84 to the wheel speed sensor 14, the lateral accelerometer 16 and the steering angle detector 18. A printed circuit board (not shown) or circuit substrate (also not shown) is carried within the ECU housing 84. Electronic components, including a microprocessor for controlling the roll control system and a memory unit for storing a system control algorithm, are mounted upon the printed circuit board or substrate.

The hydraulic valve body 86 carries a plurality of proportional solenoid valves 106 and 118 and digital solenoid valves 128, 130, 142 and 144 that operate the roll control system. The armatures of the solenoid valves are enclosed within cylindrical sleeves that extend in an upward direction from the top surface of the hydraulic valve body 86, as shown in FIG. 4. Additionally, electrical connectors 93 for pressure sensors mounted within the valve body 86 also are carried upon the valve body top surface. Solenoid coils (not shown) for activation of the valves are carried upon the lower surface of the printed circuit board that is disposed within the ECU housing 84 as are electrical connectors corresponding to the pressure sensor connectors 93. When the ECU housing 84 is attached to the hydraulic valve body 86, each solenoid coil receives a corresponding valve sleeve while the pressure sensor connectors co-operate to provide an electrical connection between the sensors and the ECU 12. In accordance with the stored algorithm, the microprocessor in the ECU 12 is responsive to signals received from the vehicle sensors and pressure sensors to selectively actuate the solenoid valves by applying a voltage to the corresponding solenoid coils. Internal passageways (not shown) formed within the hydraulic valve body 86 provide fluid communication between the solenoid valves and also with ports 94 formed in the sides of the valve body 86.

The ECU housing 84 is removable from the hydraulic valve body 86 to facilitate maintenance. The invention contemplates that the hydraulic circuit for the roll control unit 82 remains sealed by the valve sleeves when the ECU housing 84 is removed from the valve body 86, thus avoiding the need to purge air from the system following re-assembly. Additionally, it is possible to install a replacement ECU 12 and housing 84 assembly to allow operation of vehicle while the original ECU 12 is returned to a central location for servicing, thus reducing the time needed to repair the vehicle.

Returning to FIG. 3, the hydraulic valve body 86 is connected to the pump 44 and hydraulic fluid reservoir 48 by hydraulic lines 50 and 66, respectively. The hydraulic valve body 62 also is connected by other hydraulic lines, that are labeled 132, 134, 136 and 138, to the front and rear cylinder and piston assemblies 22 and 28. Thus, the integrated control unit 82 provides a single centralized assembly for the active roll control system 80. As also shown in FIG. 3, the power steering valve assembly 56 is directly connected to the pump 44 by a hydraulic supply line 100 and to the reservoir 48 by the hydraulic discharge line 57.

Figure 5:
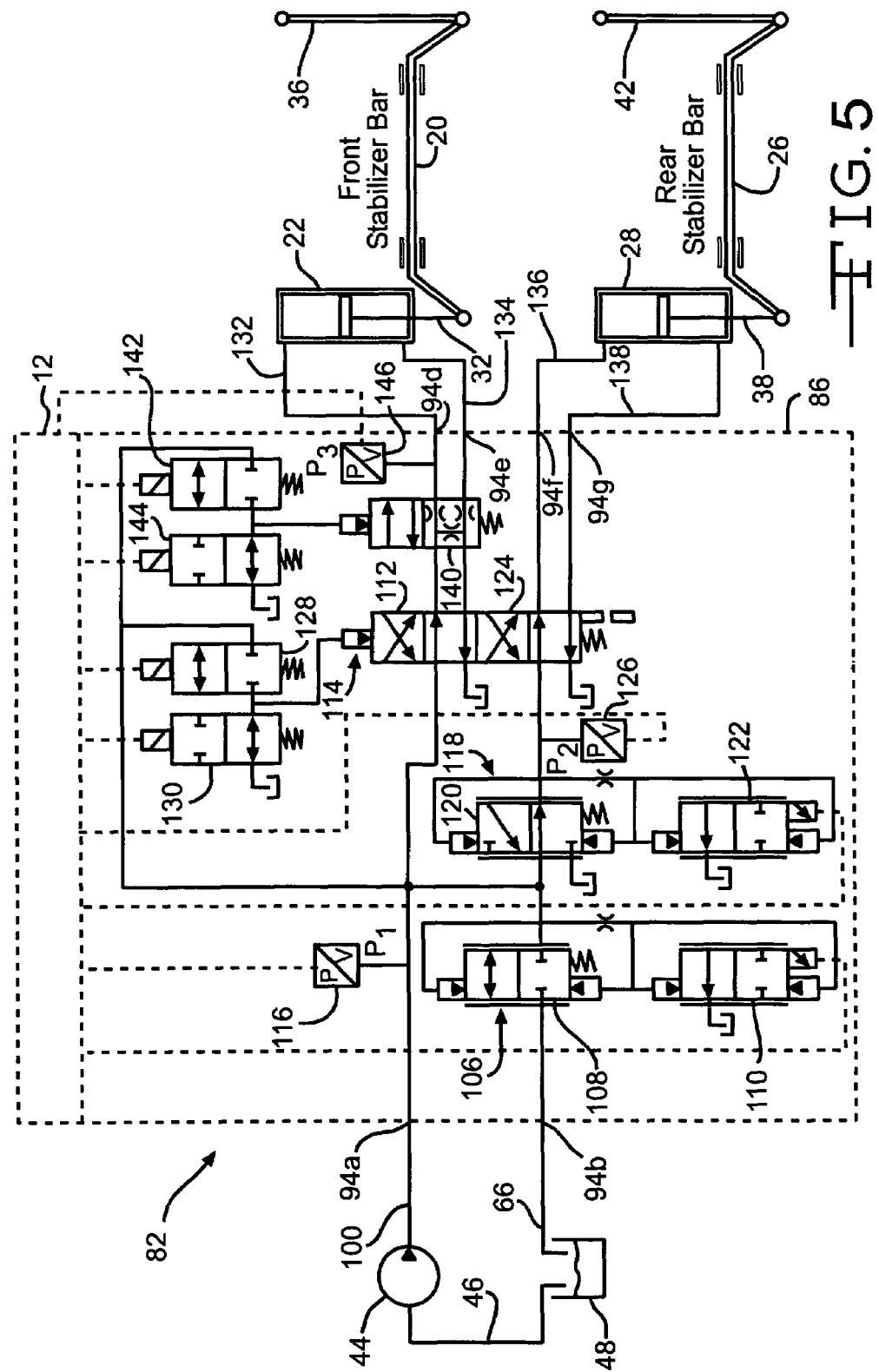
FIG. 5 is a schematic drawing of a multi-channel control system included in the control system shown in FIG. 3.

A schematic diagram for the roll control system 80 is shown in FIG. 5, where components shown in previous figures have the same numerical identifiers. In FIG. 5, hydraulic fluid lines and valve body internal passageways are shown by solid lines while electrical connections between the ECU 12 and electrical components such as valve solenoids and pressure sensors are shown by dashed lines. The discharge port of a hydraulic pump 44 is connected by a hydraulic fluid supply line 100 to a valve body inlet port 94a to supply pressurized hydraulic fluid to passageways formed within the valve body 86. The hydraulic pump may be a power steering pump driven by the vehicle engine, as described above, an electric motor driven pump or vehicle engine driven pump which is dedicated to the ARC system 10 or an electric motor driven pump that is included in another vehicle system, such as, for example, an anti-lock brake system. In FIG. 3, a vehicle engine driven pump is shown that supplies fluid only to the ARC system. When a power steering pump is utilized, the system includes a priority valve (not shown) to divide the supply of the pressurized fluid between the ARC and the power steering systems. As also shown in FIG. 5, a valve body discharge port 94b is connected by a hydraulic fluid discharge line 66 to the reservoir 48. A pump supply hydraulic fluid line 46 connects the reservoir 48 to an intake port of the pump 44.

Returning to FIG. 5, the pressure control stage 106 includes a normally closed pilot operated valve 108 controlled by a first proportional solenoid valve 110. The solenoid of the first proportional valve 110 is electrically connected to the ECU 12 and controlled with a variable duty Pulse Width Modulated (PWM) voltage supplied by the ECU 12. The pressure control stage 106 is operable to control the pressure of the fluid supplied to a first stage 112 of a pilot operated two position, two stage four way spool control valve 114. The pressure $P_1$ at the discharge of the first pilot operated valve is monitored by a first pressure sensor 116 that is operative to generate an electrical pressure signal that is sent to the ECU 12.

The fluid output of the pressure control stage 106 also is supplied to a pressure reduction stage 118 that is disposed within the hydraulic valve body 86. Similar to the pressure control stage 106, the pressure reduction stage 118 includes a normally open pilot operated valve 120 controlled by a second proportional solenoid valve 122. The solenoid of the second proportional valve 122 is electrically connected to the ECU 12 and controlled with a variable duty PWM voltage supplied by the ECU 12. The pressure reduction stage 118 is operable to control the pressure of the fluid supplied to a second stage 124 of the spool control valve 114. The pressure $P_2$ at the discharge of the second pilot operated valve is monitored by a second pressure sensor 126 that is operative to generate an electrical pressure signal that is sent to the ECU 12.

The pilot pressure for the spool valve 114 is provided by a normally closed digital solenoid valve 128 and a normally open solenoid valve 130 having solenoids electrically connected to the ECU 12. The normally closed solenoid valve 128 receives pressurized fluid from the output of the pressure control stage 106 and is operable, upon actuation, to supply pressurized fluid to a pilot port of the spool control valve 114, causing the valve spool to move in a downward direction in FIG. 5. The normally open solenoid valve 130 is operable, upon actuation, to bleed the pressurized fluid from the pilot port, allowing an internal return spring within the spool valve 114 to urge the valve spool in an upward direction in FIG. 5. The hydraulic fluid bled from the valve pilot port is returned to the reservoir 48.

The first stage 112 of the spool control valve 114 includes a first position that provides a direct flow between the stage input and discharge ports and a second position that provides a cross-over flow between the stage input and discharge ports. The control valve 114 includes an internal spring that urges the spool in an upward direction in FIG. 5 to place the first stage into the first position. The discharge ports of the first stage 112 of the spool control valve 114 define a first control stage and are connected via a first pair of discharge ports 94d and 94e and hydraulic lines 132 and 134, respectively, to the front suspension system actuator 22. Similarly, the second stage 124 of the spool control valve 114 includes a first position that provides a direct flow between the stage input and discharge ports and a second position that provides a cross-over flow between the stage input and discharge ports. The control valve internal spring that urges the spool in an upward direction in FIG. 5 to place the second stage into the first position. The discharge ports of the second stage 124 define a second control stage and are connected via a second pair of discharge ports 94f and 94g and hydraulic lines 136 and 138, respectively, to the rear suspension system actuator 28.

The ARC system 80 also includes a one stage four way pilot operated fail safe valve 140 disposed between the output of the first stage 112 of the spool control valve 114 and the first channel outlet ports 94d and 94e. The fail safe valve 140 includes a pilot port that is connected to a second pair of digital solenoid valves. Similar to the first pair of digital valves 128 and 130 that control the supply of pressurized hydraulic fluid to the pilot port of the control valve 114, the second pair of digital valves include a normally closed valve 142 for supplying pressurized fluid to the pilot port of the fail safe valve 140 and a normally open valve 144 for bleeding pressurized fluid from the fail safe valve pilot port. During normal operation of the ARC system 80, the solenoids of both the normally closed digital valve 142 and normally open digital valve 144 are energized to deliver pressurized hydraulic fluid to the pilot port of the fail safe valve 140 while blocking the drain to the reservoir 48. When pressurized hydraulic fluid is applied to the fail safe valve pilot port, the valve spool is urged in a downward direction in FIG. 6, allowing free flow of hydraulic fluid from the control valve to the front actuator 22. However, if the ARC system should be deactivated, either by the ECU 12 or due to a loss of power or a detected malfunction within the system, the digital valves 142 and 144 are de-energized, draining the hydraulic fluid from the fail safe valve pilot port to the reservoir 48. Upon release of the pilot pressure, a return spring within the fail safe valve 140 urges the valve spool in an upward direction in FIG. 6 providing a restricted flow between the upper and lower portions of the front actuator 22. As a result, the piston within the front actuator 22 will return to a center neutral position and no torque will be exerted by the actuator upon the front roll bar 20. A third pressure sensor 146 is connected to one of the first channel discharge ports 94d to monitor the pressure of the fluid being delivered to the first actuator 22.

The invention also contemplates optionally adding a second one stage four way pilot operated fail safe valve (not shown) between the output of the second stage 124 of the spool control valve 114 and the second channel outlet ports 94f and 94g that are connected to the rear actuator 28. The second fail safe valve would provide protection to the second channel and be controlled by pressurized pilot fluid supplied by either the second pair of digital valves 142 and 144 or by a third set of digital valves (not shown). Additionally, a fourth pressure sensor (not shown) would be connected to the one of the second channel discharge ports 94f or 94g to monitor the pressure of the fluid being delivered to the rear actuator 28. It is also contemplated that the invention may be practiced with a fail safe valve included in only the second channel.

The operation of the system 80 will now be described. Upon initial energization of the pump 44, pressurized hydraulic fluid will be supplied through the direct flow portions of the spool valve stages 112 and 124 to the upper portion of each of the actuators 22 and 28, while the hydraulic fluid in the lower portion of each actuator is drained to the reservoir 48. As result, the pistons in each actuator are forced to move in a downward direction in FIG. 5, changing the torque applied to the front and rear roll, or stabilizer, bars 20 and 26, respectively. However, because two channels are provided that supply hydraulic fluid at different pressures to the actuators, the change in torque applied to the roll bars will be differ between the front and rear of the vehicle. Actuation of the digital valves by the ECU 12 in response to signals received from the wheel speed and vehicle motion sensors, reverse the flow of the hydraulic fluid, causing the pistons within the actuators 22 and 28 to be urged in an upward direction in FIG. 5 with a corresponding reduction of the torque applied to the roll bars 20 and 26. Again, due to the different pressures supplied to the two channels, the torque reduction on the roll bars will be different for the front and rear bars. In the preferred embodiment, a Pulse Width Modulated (PWM) voltage with a controlled variable duty cycle is applied to the digital valve solenoids to control the solenoid current. By varying the duty cycle the current applied to the digital solenoid valves 128 and 130, the position of the piston in each of the actuators may be precisely controlled.

Additionally, the present invention contemplates that pressure data for each channel received from the first and second pressure sensors 116 and 126 may be utilized by the ECU 12 to adjust the channel pressures by varying the current supplied to the solenoids of the proportional valves 110 and 122 in the pressure control and pressure reduction stages 106 and 118. Similar to the digital solenoid valves, in the preferred embodiment, a (PWM) voltage with a controlled variable duty cycle is also applied to the proportional valve solenoids to control the solenoid current. This provides further flexibility in controlling the torque applied to the front and rear roll bars 20 and 26 and thereby also controlling the response of the ARC system 80. The invention also contemplates using digital solenoid valves from ABS for the digital solenoid valves 128 and 130 controlling the spool valve 114 in order to simplify system components.

Figure 6:
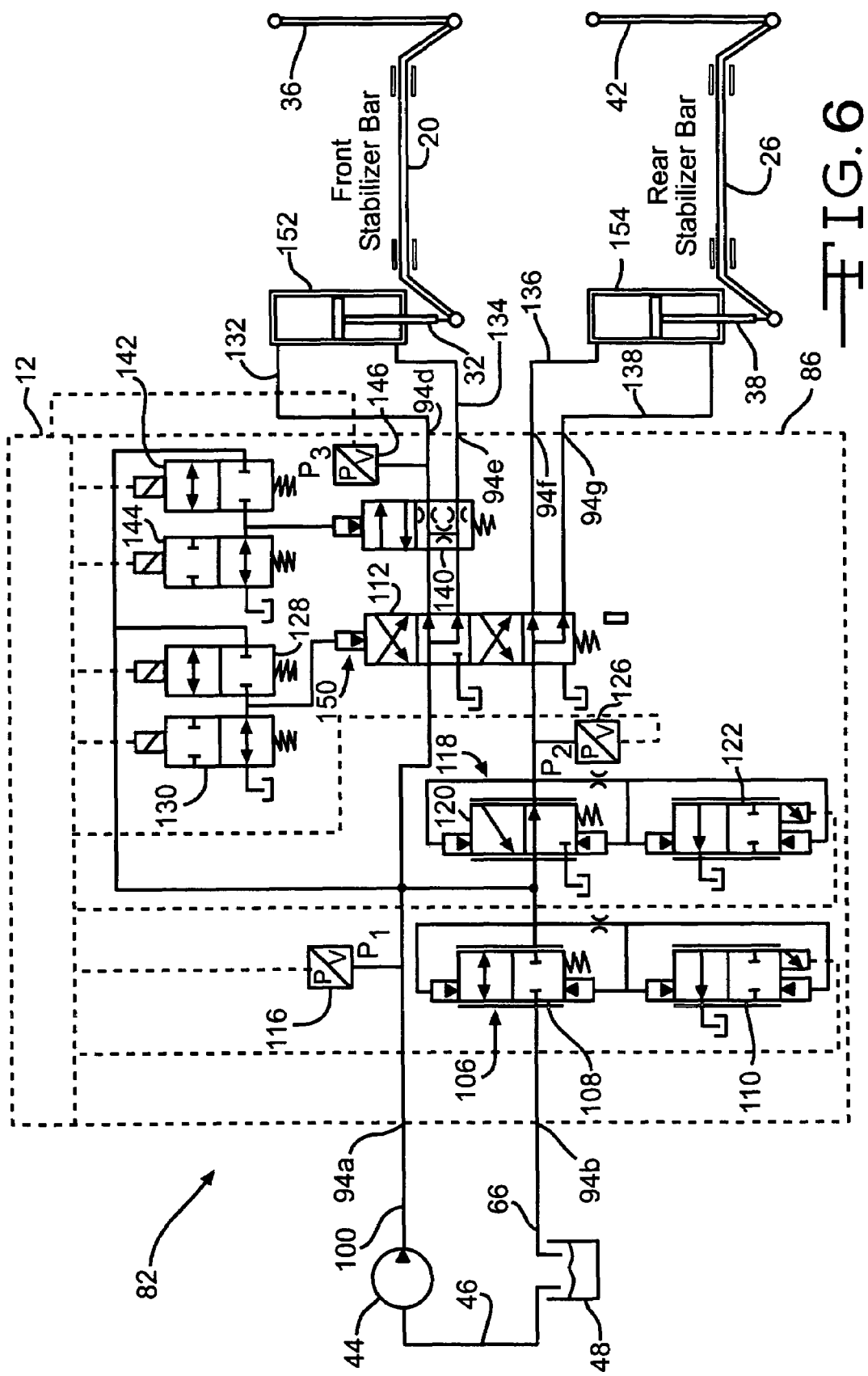
FIG. 6 is a schematic drawing of an alternate embodiment of the control system included in the system shown in FIG. 3.

An alternate embodiment of the ARC system is illustrated in FIG. 6 where again components that are similar to components shown in FIG. 5 have the same numerical identifiers. As shown in FIG. 6, the alternate ARC system includes a spool control valve 150 in which each stage provides either an increased pressure to one end of the associated actuator or the same pressure to both ends of the actuator. The actuators 152 and 154 are modified with upper portion having a greater piston surface area than the lower portion. Accordingly, the positions of the pistons 152 and 154 are controlled by both the control valve spool position and the pressure supplied to the control valve.

Figure 7:
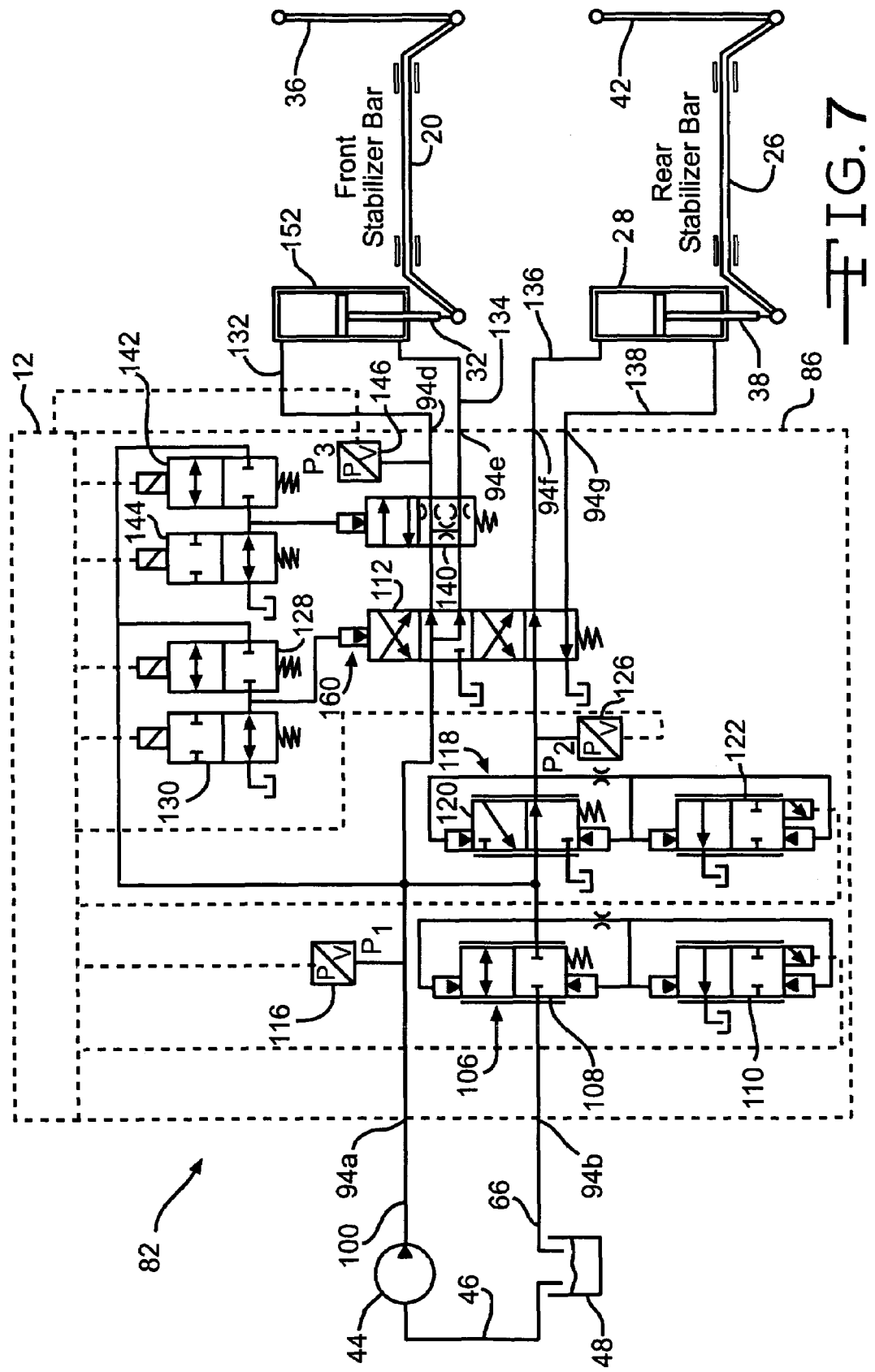
FIG. 7 is a schematic drawing of another alternate embodiment of the control system included in the system shown in FIG. 3.

An alternate embodiment of the system shown in FIG. 6 is illustrated in FIG. 7 where the control valve 160 is a hybrid combination of the previously described control valves 114 and 150. Thus, the upper stage of the valve 160 in FIG. 7 is the same as the upper stage of the valve 150 while the lower stage of the valve 160 is the same as the lower stage of the valve 114. Accordingly, an actuator 152 having different piston surfaces is associated with the upper stage and connected to one end of the front roll bar 20 while a conventional linear actuator 28 is connected to one end of the rear roll bar 26. The present invention also contemplates providing a control valve with the stages shown in FIG. 7 reversed (not shown) and that would include a conventional linear actuator attached to the front roll bar 20 and an actuator 154 having different piston surfaces connected to the rear roll bar 26.

Figure 8:
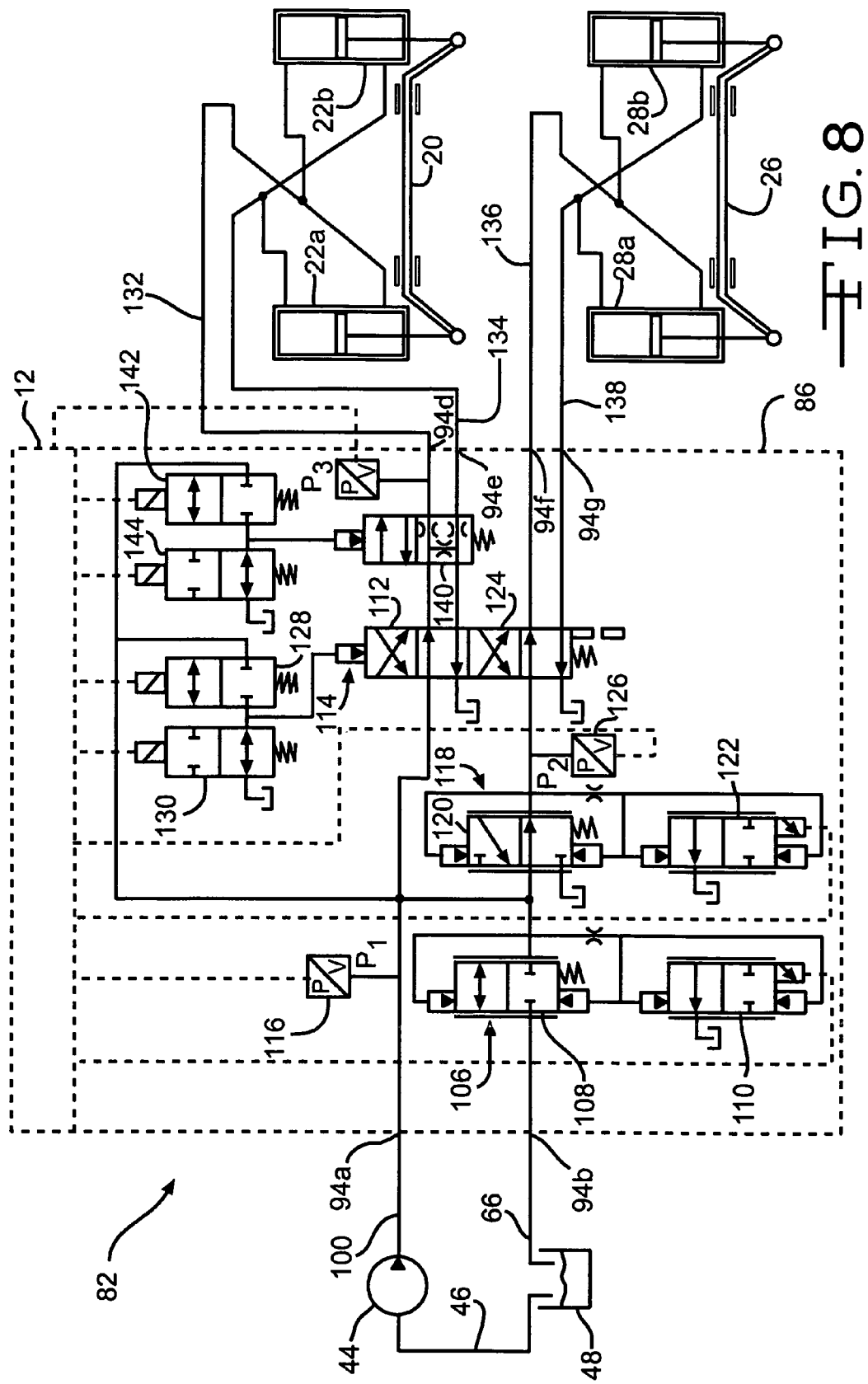
FIG. 8 is a schematic drawing of another alternate embodiment of the control system included in the system shown in FIG. 3.

Another alternate embodiment of the ARC system 80 is illustrated in FIG. 8 where again components that are similar to components shown in FIG. 5 have the same numerical identifiers. The alternate embodiment shown in FIG. 8 includes a pair of actuators for each roll bar. Thus, a first front actuator 22a is attached to the left end of the front roll bar 20 and a second front actuator 22b is connected to the right end of the front bar. The hydraulic supply lines to the front actuators are crossed such one of the first channel discharge port 94d is connected to the upper portion of the first front actuator 22a and the lower portion of the second front actuator 22b. Similarly, the other first channel discharge port 94e is connected to the lower portion of the first front actuator 22a and the upper portion of the second front actuator 22b. Accordingly, when the control valve spool is urged in a downward direction in FIG. 8, the piston in the first front actuator 22a is pushed down while the piston in the second front actuator 22b is pushed up, with a net result that opposite torques are applied to the ends of the front roll bar 20. As also shown in FIG. 8, a similar connection in provided for the first and second rear actuators 28a and 28b, respectively. Upon de-energization of the digital solenoid valves 128 and 130 that supply the pilot fluid, the control valve spool is urged by an internal spring in an upward direction in FIG. 8 reversing the flow and thereby reducing the torque applied to the roll bars 20 and 26.

Figure 9:
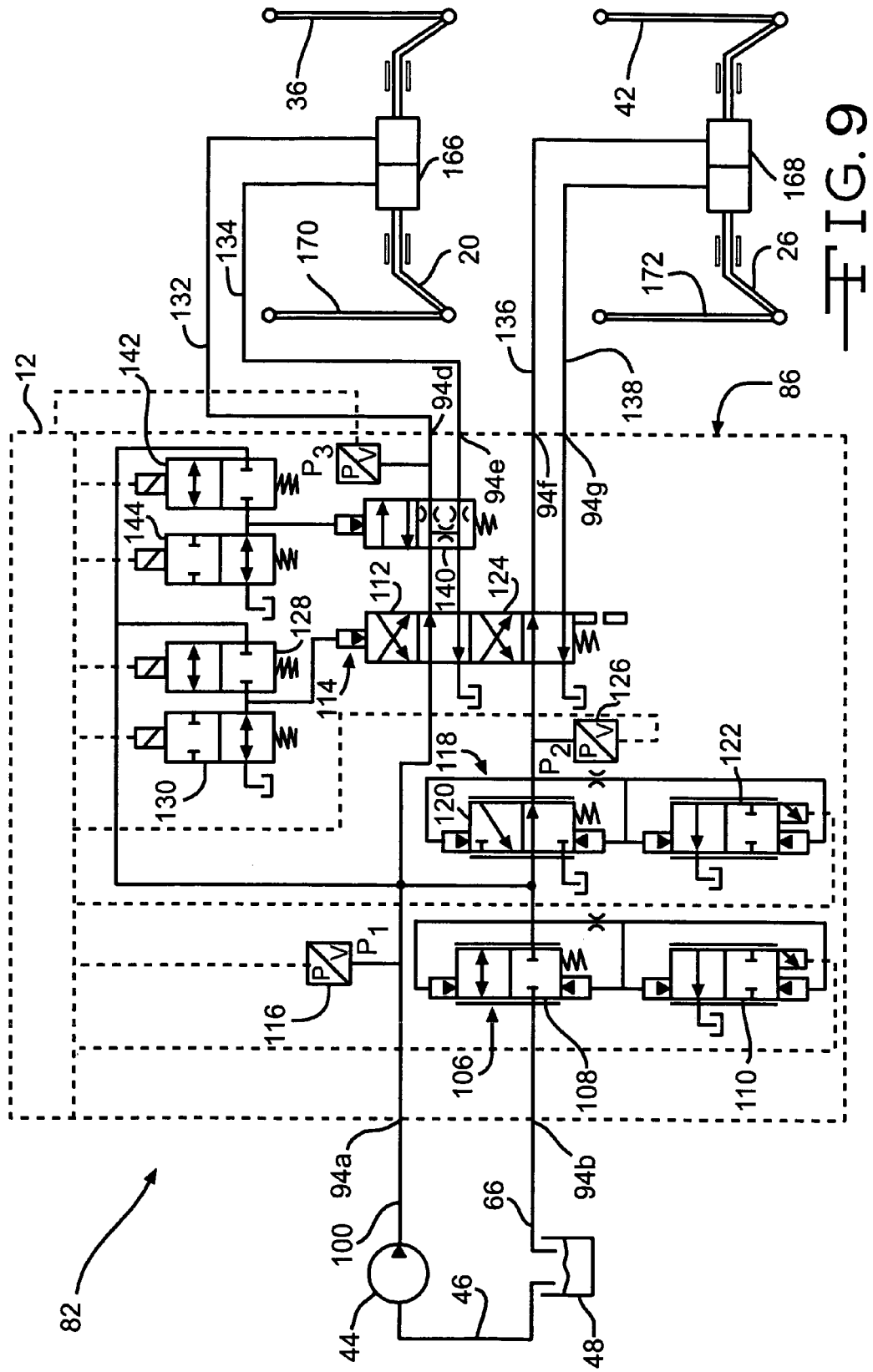
FIG. 9 is a schematic drawing of another alternate embodiment of the control system included in the system shown in FIG. 3.

Another alternate embodiment of the ARC system 80 is illustrated in FIG. 9 where again components that are similar to components shown in FIG. 5 have the same numerical identifiers. As shown in FIG. 9, each of the front and rear roll bars 20 and 26 are connected a centrally mounted rotatable actuator 166 and 168, respectively. Accordingly, both ends of the front roll bar 20 are connected by struts 36 and 170 the corresponding front suspension arms 34 while the both ends of the rear roll bar 26 are connected by struts 42 and 172 to corresponding rear suspension arms 40. As the spool in the control valve 114 is moved, the actuators 166 and 168 are operable to apply torques to the centers of the roll bars 20 and 26, respectively.

Figure 10:
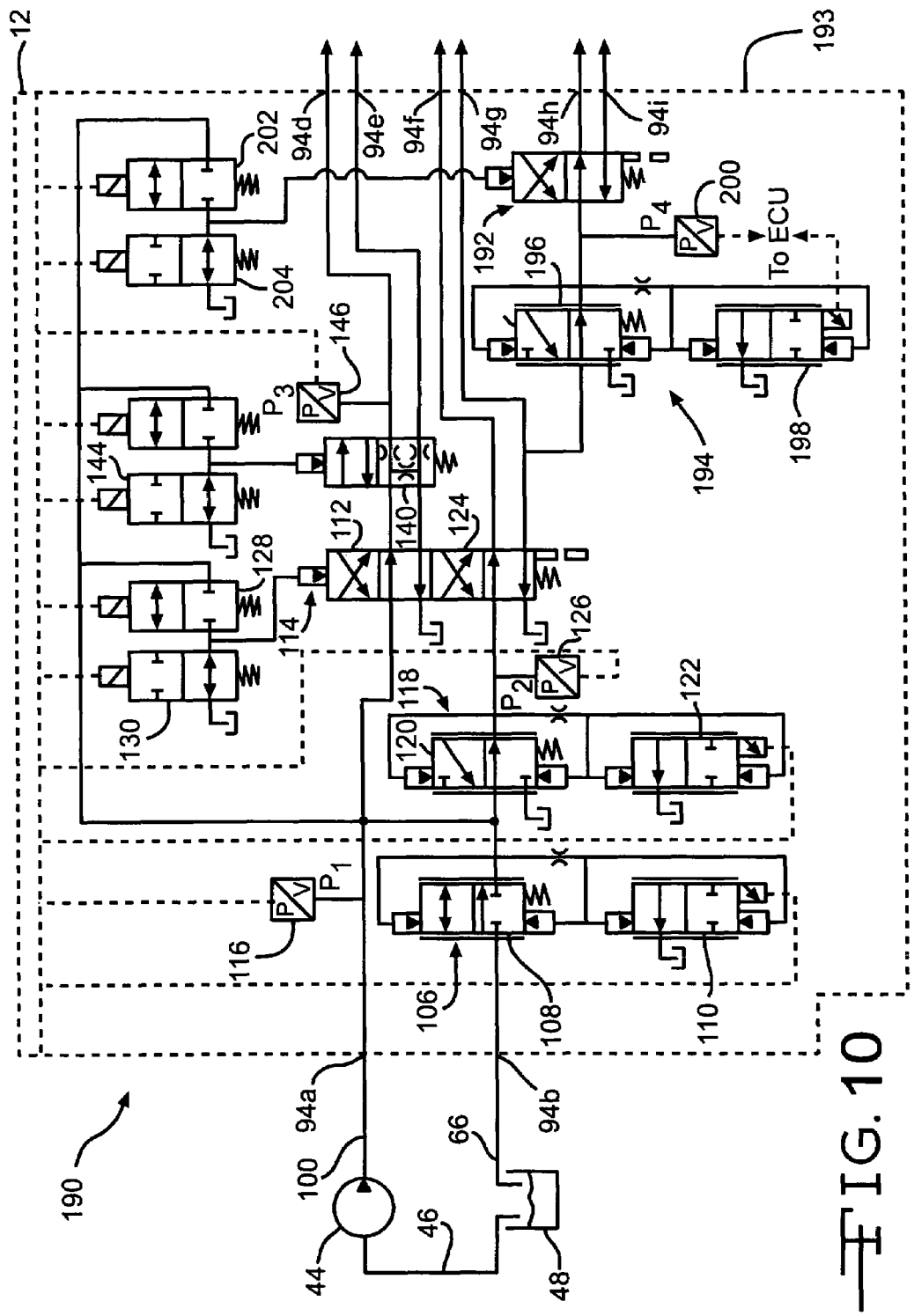
FIG. 10 is a schematic drawing of an alternate embodiment of the control unit for the system shown in FIG. 3 that includes three channels.

The invention further contemplates ARC systems having multiple channels in excess of two. Accordingly, a schematic diagram an integrated control unit 190 having three channels is illustrated in FIG. 10, where components shown in the figure that are similar to components shown in the preceding figures have the same numerical designators. The third channel is provided by a single stage four way two position pilot operated spool control valve 192 that is disposed within a hydraulic valve body 193 and that discharges though ports 94h and 94i. As shown in FIG. 10 the second spool control valve 192 provides for a reversible flow similar to the stages of the control valve 114 shown in FIG. 5; however, the invention also may be practiced with the control spool valve having a stage (not shown) similar to one of the stages of the control valve 150 shown in FIG. 6.

Pressurized hydraulic fluid is supplied to the spool control valve 192 from a second pressure reduction stage 194 that includes a third normally open pilot operated valve 196 controlled by a third proportional solenoid valve 198. The solenoid of the third proportional valve 198 is electrically connected to the ECU 12 and controlled with a variable duty PWM voltage supplied by the ECU 12. The second pressure reduction stage 194 is operable to control the pressure of the fluid supplied to the single stage spool control valve 192. The pressure $P_4$ at the discharge of the third pilot operated valve 196 is monitored by a fourth pressure sensor 200 that is operative to generate an electrical pressure signal that is sent to the ECU 12.

Similar to the previously described systems, the pilot pressure for the single stage spool valve 192 is provided by a normally closed digital solenoid valve 202 and a normally open solenoid valve 204 having solenoids electrically connected to the ECU 12. The normally closed solenoid valve 202 receives pressurized fluid from the output of the pressure control stage 106 and is operable, upon actuation, to supply the pressurized fluid to the pilot port of the spool valve 192, causing the valve spool to move in a downward direction in FIG. 10. The normally open solenoid valve 204 is operable, when not activated, to bleed the pressurized fluid from the pilot port, allowing the valve spool to move in an upward direction in FIG. 10. The hydraulic fluid bled from the valve pilot port is returned to the reservoir 48.

While a three channel is illustrated in FIG. 10, it will be appreciated that the present invention contemplates a four channel system in which the single stage spool control valve 192 is replaced by a two stage spool control valve (not shown) similar to the control valve 114 shown in FIG. 5, or one of the spool control valves shown in FIGS. 6 and 7. The second stage of the control valve would be supplied with a hydraulic fluid at a further reduced pressure by a third pressure reduction sage (not shown) similar to two pressure reduction stages 118 and 194 described above.

Figure 1:
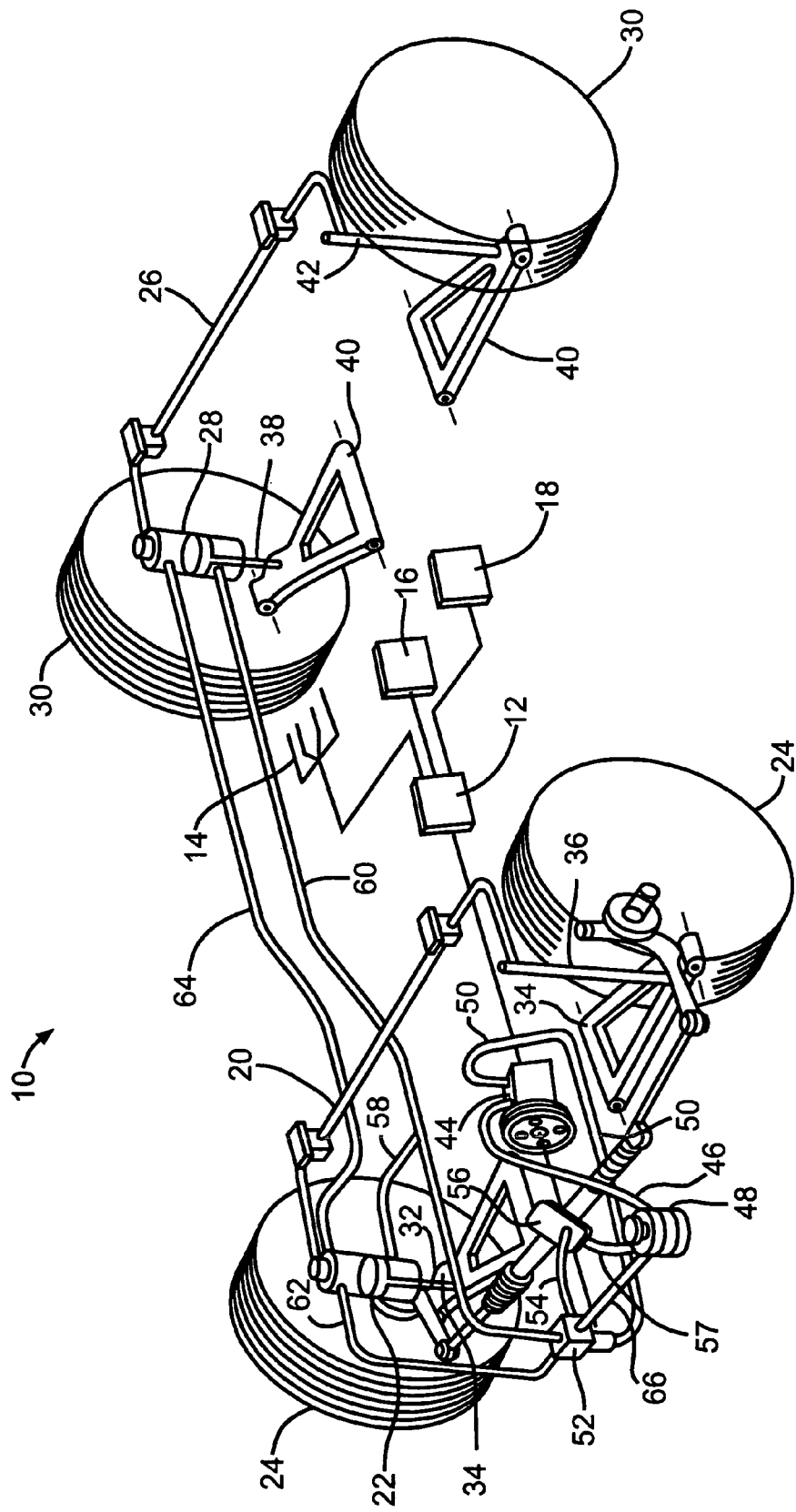
FIG. 1 is a schematic drawing of a known roll control system for a vehicle suspension system.
Figure 2:
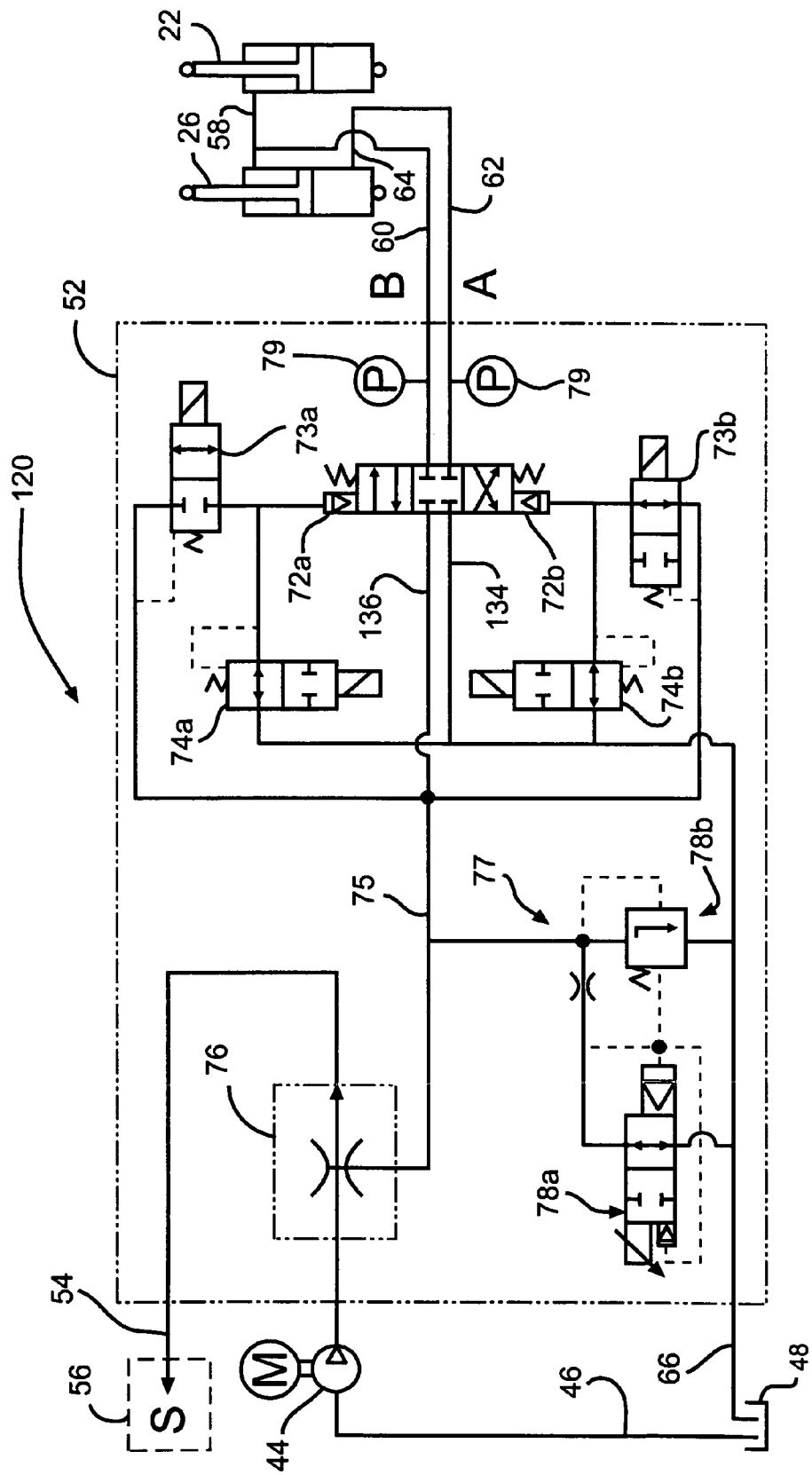
FIG. 2 is a fluid schematic drawing for the known roll control system shown in FIG. 1.
Figure 11:
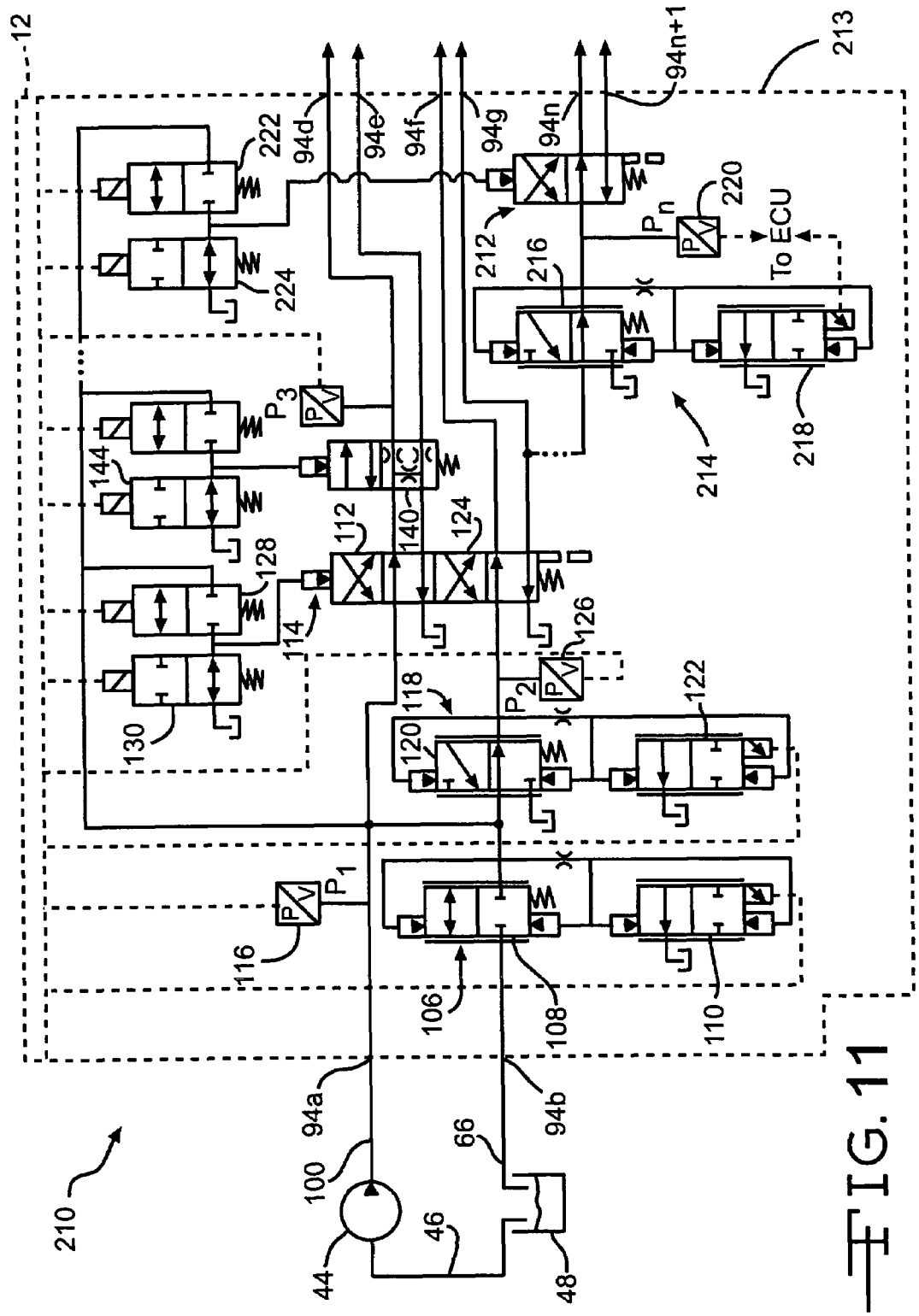
FIG. 11 is a schematic drawing of an alternate embodiment of the control unit for the system shown in FIG. 3 that includes n-channels.

The invention also contemplates expanding the integrated control unit 190 illustrated in FIG. 11 to an n-channel unit, shown generally at 210 in FIG. 11. Again, components shown in the figure that are similar to components shown in the preceding figures have the same numerical designators. The $n^{th}$ channel is provided by an $n^{th}$ channel single stage four way two position pilot operated spool control valve 212 that is disposed within a hydraulic valve body 213 and that discharges through ports $94_n$ and $94_{n+1}$. As shown in FIG. 1 the $n^{th}$ channel spool control valve 212 provides for a reversible flow similar to the stages of the control valve 114 shown in FIG. 5; however, the invention also may be practiced with the control spool valve having a stage (not shown) similar to one of the stages of the control valve 150 shown in FIG. 6.

Pressurized hydraulic fluid is supplied to the $n^{th}$ channel spool control valve 212 from an $n^{th}$ channel pressure reduction stage 214 that includes an $n^{th}$ normally open pilot operated valve 216 controlled by an $n^{th}$ proportional solenoid valve 218. The solenoid of the $n^{th}$ proportional valve 218 is electrically connected to ECU 12 and controlled with a variable duty PWM voltage supplied by the ECU 12. The $n^{th}$ channel pressure reduction stage 214 is operable to control the pressure of the fluid supplied to the single stage spool control valve 212. The pressure $P_n$ at the discharge of the $n^{th}$ pilot operated control valve 216 is monitored by an $n^{th}$ sensor 220 that is operative to generate an electrical pressure signal that is sent to the ECU 12.

Similar to the previously described systems, the pilot pressure for the single stage spool valve 212 is provided by a normally closed digital solenoid valve 222 and a normally open solenoid valve 224 having solenoids electrically connected to the ECU 12 (not shown). The normally closed solenoid valve 222 receives pressurized fluid from the pressure control stage 106 and is operable, upon actuation, to supply the pressurized fluid to the pilot port, causing the valve spool to move in a downward direction in FIG. 11. The normally open solenoid valve 224 is operable, when not activated, to bleed the pressurized fluid from the pilot port, allowing the valve spool to move in an upward direction in FIG. 11. The hydraulic fluid bled from the valve pilot port is returned to the reservoir 48

It will be appreciated that any number of single and/or two stage spool control valves (not shown) similar to those shown in the preceding figures may be included in the control unit 210 with additional pressure reduction stages to supply hydraulic fluid at a different pressure to each of the control valve stages. Furthermore, while not show in FIGS. 10 and 11, the invention also contemplates that a fail safe valve similar to the valve 140 shown in FIGS. 5 through 9 may be optionally added to any or all of the channels.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A multi-channel active roll control system for a vehicle suspension comprising:

a two stage four way two position pilot actuated spool valve, having a first input port of a first stage adapted to be connected to a source of pressurized fluid and a second input port of said first stage adapted to be connected to a fluid reservoir;

a valve body;

a pressure reduction stage disposed within said valve body and having an input adapted to be connected to said source of pressurized fluid and an output connected to a first input port of a second stage of said spool valve, said second stage of said spool valve also having a second input port adapted to be connected to said fluid reservoir, with said first stage of said spool valve having a pair of output ports that define a first channel having a first operating pressure and said second stage of said spool valve having a pair of output ports that define a second channel having a second operating pressure that is less than said first operating pressure; and a controller operative to control a supply of pilot fluid to said spool valve, wherein said spool valve has a pilot port for receiving pressurized fluid for moving a valve spool disposed within said spool valve and further wherein said pilot port is connected to a pair of digital solenoid valves that are operable to selectively apply pressurized fluid to said spool valve pilot port and further wherein said solenoid valves have solenoids electrically connected to said controller, said controller being operative to selectively actuate said solenoids.

2. The system according to claim 1 wherein said controller is operative to supply a pulse width modulated voltage having a variable duty cycle to said digital valve solenoids.

3. The system according to claim 1 wherein one of said digital valves is adapted to be connected to said reservoir, said valve being operable to release hydraulic fluid from said pilot port to said reservoir.

4. The system according to claim 3 wherein said pressure reduction stage includes a pilot operated normally open valve and a first proportional solenoid valve connected to said pilot operated valve, said first proportional valve having a solenoid connected to said controller, said controller being operable to control the pressure supplied by said pilot operated valve.

5. The system according to claim 4 wherein said controller is operative to supply a pulse width modulated voltage having a variable duty cycle to said first proportional valve solenoid.

6. The system according to claim 5 wherein said valves are disposed within said valve body and further wherein said controller is disposed with a removable housing that is carried by said valve body.

7. The system according to claim 4 further including a pressure control stage disposed within said valve body and having an input port adapted to be connected to said source of pressurized fluid and an output port connected to said first input port of spool valve first stage and to said pressure reduction stage having an input, said pressure control stage operable to maintain a predetermined fluid pressure.

8. The system according to claim 7 wherein said pressure control stage includes a pilot operated normally closed valve and a second proportional solenoid valve connected to said pilot operated valve, said second proportional valve having a solenoid connected to said controller, said controller being operable to control the pressure supplied by said pilot operated valve.

9. The system according to claim 8 wherein said controller is operative to supply a pulse width modulated voltage having a variable duty cycle to said second proportional valve solenoid.

10. The system according to claim 8, wherein said first channel output ports are connected to at least one first actuator.

11. The system according to claim 8 further including a one stage four way pilot operated fail safe valve connected between said first stage spool valve outlet ports and a pair of first channel valve body discharge ports.

12. The system according to claim 11 further including a pair of digital solenoid valves that are operable to selectively apply pressurized fluid to a fail safe valve pilot port and further wherein said solenoid valves have solenoids electrically connected to said controller, said controller being operative to selectively actuate said solenoids.

13. The system according to claim 12 wherein said source of pressurized fluid is a motor driven pump.

14. The system according to claim 13 wherein said motor driven pump is included in a vehicle electronic brake system.

15. The system according to claim 12 wherein said source of pressurized fluid is a vehicle engine driven pump and further wherein the system includes a priority flow valve connected to said engine driven pump, said priority flow valve operable to divide the fluid flow supplied by said engine driven pump between the system and a vehicle power steering system.

16. The system according to claim 8 wherein said spool valve is a first spool valve and said pressure reduction stage is a first pressure reduction stage and further wherein a second pressure reduction stage and a second spool valve are disposed within said valve body, said second pressure reduction stage having an input connected to said output of said first pressure reduction stage and an output connected to a first input port of said spool valve, said second spool valve also having a second input port adapted to be connected to said fluid reservoir, said second spool valve having a pair of output ports that define a third channel having a second operating pressure that is less than said first operating pressure.

17. The system according to claim 8 wherein a plurality of spool valves are disposed within said valve body, said spool valves being supplied by a plurality of associated pressure reduction stages to define a plurality of channels, each of said channels providing a controlled supply of pressurized fluid at a different pressure from the other channels.

* * * * *

UNITED STATES PATENT AND TRADEMARK OFFICE
CERTIFICATE OF CORRECTION

PATENT NO.        : 7,487,973 B1
APPLICATION NO. : 11/210377
DATED             : February 10, 2009
INVENTOR(S)       : Dirk Kesselgruber et al.

It is certified that error appears in the above-identified patent and that said Letters Patent is hereby corrected as shown below:

Column 12, Claim 10, line 16, before the "." insert -- that is operable to apply a first torque to a first vehicle roll bar and further wherein said second channel output ports are connected to at least a second actuator that is operable to apply a second torque to a second vehicle roll bar --.

Signed and Sealed this

Eighth Day of September, 2009

David J. Kappos
*Director of the United States Patent and Trademark Office*